US009698835B2

(12) United States Patent
Kowalevicz

(10) Patent No.: US 9,698,835 B2
(45) Date of Patent: Jul. 4, 2017

(54) SYSTEM AND METHOD TO DETECT TIME-DELAYS IN NON-PERIODIC SIGNALS

(71) Applicant: Raytheon Company, Waltham, MA (US)

(72) Inventor: Andrew M. Kowalevicz, Arlington, VA (US)

(73) Assignee: Raytheon Company, Waltham, MA (US)

( * ) Notice: Subject to any disclaimer, the term of this patent is extended or adjusted under 35 U.S.C. 154(b) by 229 days.

(21) Appl. No.: 14/704,929

(22) Filed: May 5, 2015

(65) Prior Publication Data
US 2015/0319061 A1 Nov. 5, 2015

Related U.S. Application Data

(60) Provisional application No. 61/988,416, filed on May 5, 2014, provisional application No. 61/988,409, filed on May 5, 2014, provisional application No. 61/988,423, filed on May 5, 2014, provisional application No. 61/988,418, filed on May 5, 2014.

(51) Int. Cl.
| *G06F 15/173* | (2006.01) |
|---|---|
| *H04B 1/04* | (2006.01) |
| *H04L 9/08* | (2006.01) |
| *H04L 9/16* | (2006.01) |
| *H04L 7/06* | (2006.01) |
| *H04L 7/04* | (2006.01) |
| *H04L 25/49* | (2006.01) |
| *H04L 12/26* | (2006.01) |
| *G09C 1/00* | (2006.01) |

(52) U.S. Cl.
CPC .............. *H04B 1/0475* (2013.01); *G09C 1/00* (2013.01); *H04L 7/042* (2013.01); *H04L 7/065* (2013.01); *H04L 9/08* (2013.01); *H04L 9/16* (2013.01); *H04L 25/4902* (2013.01); *H04L 43/087* (2013.01); *H04L 43/0864* (2013.01)

(58) Field of Classification Search
CPC ... G09C 1/00; H04L 25/4902; H04L 43/0864; H04L 43/087; H04L 7/042; H04L 7/065; H04L 9/08; H04L 9/16; H04B 1/0475
See application file for complete search history.

(56) References Cited

U.S. PATENT DOCUMENTS 4,221,931 A 9/1980 Seiler
5,077,761 A * 12/1991 Tokunaga ............. H04J 3/0626
370/324

(Continued)

OTHER PUBLICATIONS

"U.S. Appl. No. 14/704,900, Final Office Action mailed Mar. 15, 2017", 7 pgs.

(Continued)

*Primary Examiner* — Mohamed Wasel
(74) *Attorney, Agent, or Firm* — Schwegman Lundberg & Woessner, P.A.

(57) ABSTRACT

A method for carrying data on a live host signal, comprising the steps of: varying timing in a host signal in response to data to be encoded, wherein variations in timing are smaller than a sampling period for detection and capture of the digital signal receiving the live host signal; sensing pulse timing variations in the received live host signal by comparison to a reference signal; and determining information in the sensed timing variations.

14 Claims, 6 Drawing Sheets

(56) References Cited

U.S. PATENT DOCUMENTS

| | | | | |
|---|---|---|---|---|
| 5,699,370 | A * | 12/1997 | Kaniwa | G11B 15/087 |
| | | | | 348/460 |
| 6,163,209 | A * | 12/2000 | Myers | H03D 3/04 |
| | | | | 329/315 |
| 7,269,261 | B1 | 9/2007 | Jennings | |
| 9,509,538 | B1 * | 11/2016 | Al-Dweik | H04L 27/06 |
| 2002/0054605 | A1 * | 5/2002 | Aizawa | H04L 27/2647 |
| | | | | 370/430 |
| 2002/0071556 | A1 | 6/2002 | Moskowitz et al. | |
| 2004/0125952 | A1 | 7/2004 | Alattar et al. | |
| 2006/0036411 | A1 * | 2/2006 | Nagai | G01R 31/31937 |
| | | | | 702/189 |
| 2006/0239501 | A1 | 10/2006 | Petrovic et al. | |
| 2006/0239503 | A1 | 10/2006 | Petrovic et al. | |
| 2008/0090588 | A1 * | 4/2008 | Mizugaki | H04W 84/18 |
| | | | | 455/456.1 |
| 2008/0175115 | A1 * | 7/2008 | Muraoka | G11B 7/0908 |
| | | | | 369/53.12 |
| 2008/0253232 | A1 * | 10/2008 | Irie | G04R 20/16 |
| | | | | 368/47 |
| 2009/0196419 | A1 | 8/2009 | Tapster | |
| 2009/0287837 | A1 | 11/2009 | Felsher | |

OTHER PUBLICATIONS

"U.S. Appl. No. 14/704,900, Notice of Allowance mailed Apr. 28, 2017", 9 pgs.

"U.S. Appl. No. 14/704,900, Response filed Apr. 6, 2017 to Final Office Action mailed Mar. 15, 2017", 6 pgs.

"U.S. Appl. No. 15/581,014, Preliminary Amendment filed Apr. 28, 2017", 9 pgs.

\* cited by examiner

SYSTEM AND METHOD TO DETECT TIME-DELAYS IN NON-PERIODIC SIGNALS

CROSS REFERENCE TO RELATED APPLICATIONS

This application claims priority from U.S. Provisional Patent Application Ser. No. 61/988,409, filed May 5, 2014, U.S. Provisional Patent Application Ser. No. 61/988,416, filed May 5, 2014, U.S. Provisional Patent Application Ser. No. 61/988,423, filed May 5, 2014, and U.S. Provisional Patent Application Ser. No. 61/988,418, filed May 5, 2014, all of which are incorporated herein by reference in their entirety.

FIELD OF THE INVENTION

The present invention generally relates to communication devices, and in particular to such devices which communicate secure information.

BACKGROUND OF THE INVENTION

Often times, when U.S. Diplomats are working outside the continental United States (OCONUS), communications are closely monitored by the visited country. The monitoring is done to identify transmissions that are considered harmful to local governments. When United States personal are operating in these countries, they need to send their information back to the US using encryption to protect their mission. There are, of course, other instances where securely transmitted communications are very useful. The sending of encrypted messages either over-the-air or over a terrestrial link can bring undesired attention to the sender, which could have damaging consequences. Therefore it is useful to have a method for sending secure communications that do not appear to be secure.

SUMMARY OF THE INVENTION

One embodiment of the present invention provides a method for measuring timing variations and/or deviation from ideal waveform transitions in a first host signal, comprising: reconstructing a second host signal using the first host signal with reference to a stable clock signal; simultaneously phase detecting both the first host signal and the second host signal against a common stable clock signal; and comparing the phase detected signals for producing a signal indicating the relative timing variation within the first host signal.

The method may further comprise the step of deriving data from the indicated relative timing variation within the first host signal. The stable clock signal and the common clock signal may be the same signal. The second host signal reconstructed with reference to the stable clock signal may have negligible relative timing variation. The stable clock signal may have timing stability that is better than the timing variations of the first host signal. The first host signal and the clock signal may include an identical known timing variation. The step of comparing may adds or subtracts the phase detected first and second host signals. The first host signal may be a digital signal. The first host signal may be an analog signal.

Another embodiment of the present invention provides a system for measuring timing variations and/or deviation from ideal waveform transitions in a first host signal, comprising: a processor adapted to reconstructing a second host signal using the first host signal with reference to a stable clock signal; a pair of phase detectors coupled to simultaneously phase detect both the first host signal and the second host signal against a common stable clock signal; and a comparator coupled for comparing the phase detected signals from the pair of phase detectors for producing a signal indicating the relative timing variation within the first host signal. The processor may construct the second host signal to have negligible relative timing variation.

The system may further comprising a stable oscillator or clock for providing the stable clock signal and the common clock signal. The stable clock signal may have timing stability that is better than the timing variations of the first host signal. The comparator may adds or subtracts the phase detected first and second host signals.

BRIEF DESCRIPTION OF THE DRAWINGS

The present invention is illustratively shown and described in reference to the accompanying drawings, in which.

DETAILED DESCRIPTION OF THE DRAWINGS

The present application presents a method and system for hiding information in a host data stream, using by way of example, Gaussian Clock Dither Modulation (GCDM) with a high stability oscillator (HSO). A host (overt) communications channel is transmitted in the open using the oscillator as a frequency reference. The covert communication is applied to the host signal by modulating the timing on the reference signal of the transmitter to represent the covert (hidden) communication. While the timing variation representing the covert communication is deterministic, it is implemented such that it appears Gaussian in nature and remains within the normal operational levels of timing jitter for a less stable frequency standard of approximately 1 s-10 s of ps. The variation introduced on the clock is applied to the transmitted signals. Depending on the implementation, the variation is seen either on the carrier phase (modified zero crossings) or the data symbol falling edge (modulation of to the pulse duration). A receiver using an HSO will see the modulation and will then demodulate it.

One modulation method used is Gaussian Clock Dither Modulation (GCDM). GCDM uses a combination of statistical variation, spread spectrum and direct clock quantization. GCDM does not require making the jitter any worse than that of a typical, high quality, oscillator. Typical jitter in these oscillators is approximately 1 s-10 s of picoseconds (ps). GCDM transmits "Marks" and "Spaces" using a Gaussian distributed random variable to determine the amount of jitter to add to each symbol. Using a Gaussian distributed random variable ensures that the jitter looks Gaussian, as jitter is, and keeps the jitter to a deviation commensurate with a well-designed communications system.

Figure 1:
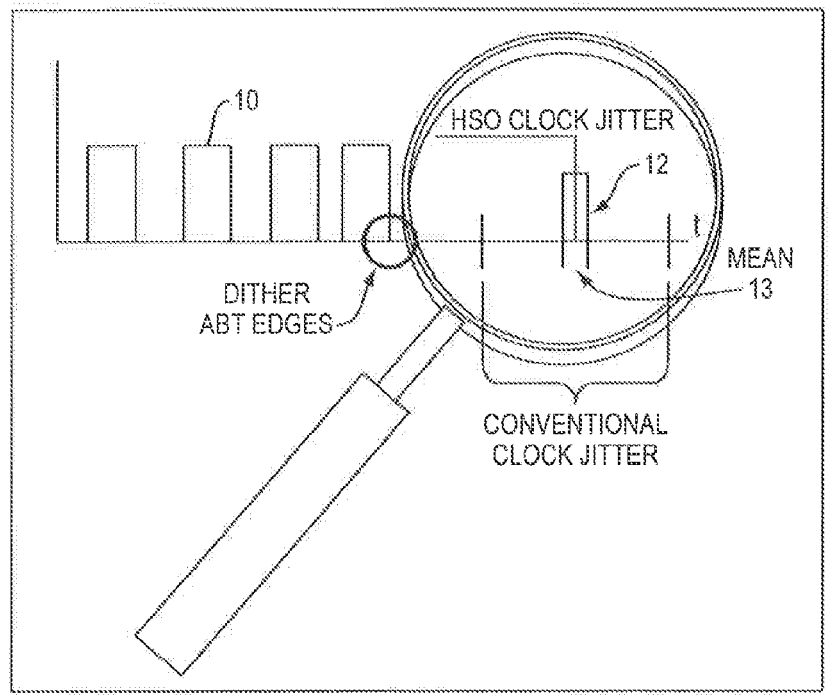
FIG. 1 is a diagram of a nominal waveform demonstrating timing jitter.

All communication systems have jitter. The greater the stability of the system's reference oscillator, the less jitter in the system. Timing jitter is illustrated in FIG. 1. Jitter is defined as the undesired deviation from true periodicity of an assumed periodic signal 10. As shown in FIG. 1, jitter causes the falling edge 12 (or rising edge) of a pulse to jitter about a mean value 13. The mean value is the desired periodicity.

Figure 2:
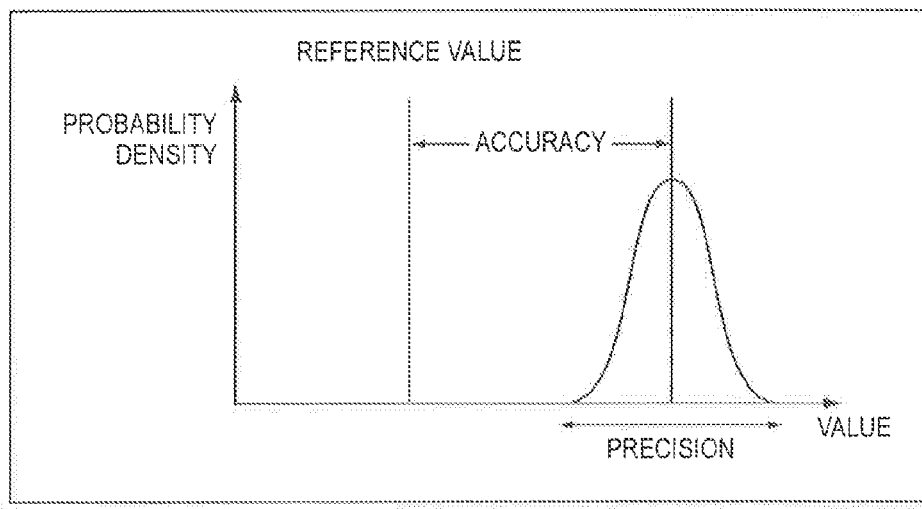
FIG. 2 is a diagram of a waveform demonstrating the difference between accuracy and precision.

For purposes of consistency of terminology, "accuracy" is how close the pulse repetition rate is to a known standard, whereas "precision" is describes the periodicity of the pulse train. The concepts of accuracy and precision are illustrated in FIG. 2. Synonyms used for precision are stability and uncertainty; these two terms are used interchangeably throughout this paper. There is however a subtle difference in the three terms. Precision is an absolute measure such as plus or minus a deviation from the mean. Uncertainty is more appropriate when discussing system performance statistically. Stability is used when one wants to refer to the affect that the precision has on the overall system performance.

In any communication system, the zero crossings of the electrical signals vary and are centered about a mean value, which is the desired periodic interval. The jitter is a result of oscillator instability and has both random and deterministic components. The deterministic component is measurable and is therefore not of concern for this discussion. The random jitter component is Gaussian in nature; it is this property that is exploited for the covert channel.

Some embodiments of the present invention use an HSO having a sufficiently low jitter such that modulation may be added to that inherent instabilty but still kept below the minimum levels of detection and capture circuitry utilizing a standard reference source.

Figure 3:
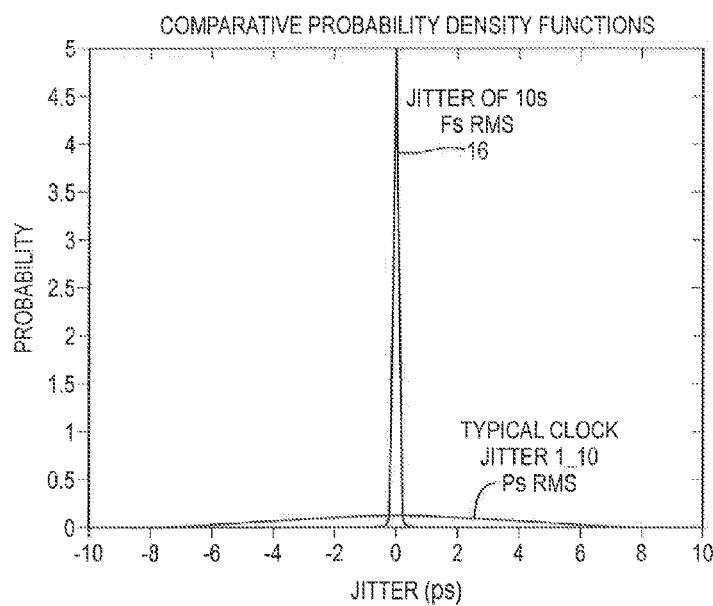
FIG. 3 is a graph of jitter probability.

FIG. 3 shows a graph of jitter 16 from a suitable oscillator. Any suitable highly stable oscillator may be used. An HSO has very low phase noise, with an equivalent timing jitter on the order of femtoseconds (fs), even for very high reference frequencies (GHz). Typical root mean squared (rms) jitter 18 is on the order of 1 s-10 s of picoseconds.

Figure 4:
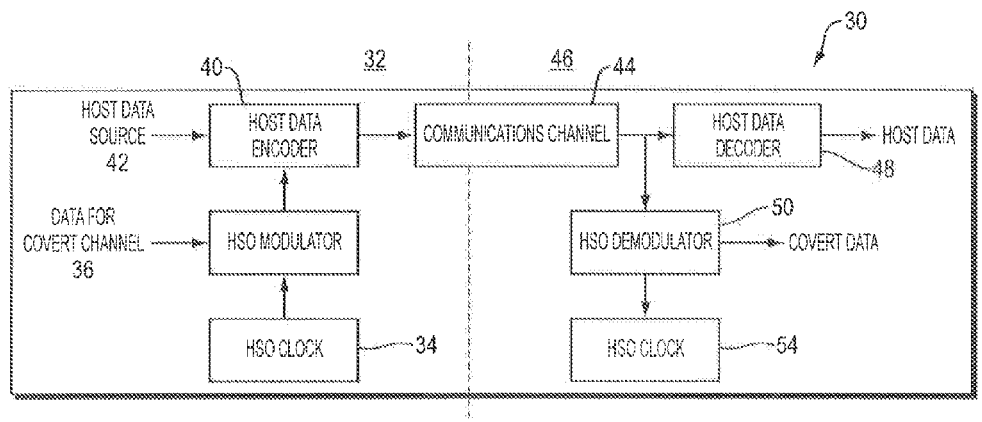
FIG. 4 is a block diagram of a data transmission system according to the present invention.

FIG. 4 shows a block diagram 30 suitable for describing the general operation of a system and method constructed according to the present invention using GCDM. A host communications system 32 uses the HSO 34 as its primary reference providing the system 32 with an rms timing jitter of ~10 s fs. Host system 32 likely introduces some further jitter. Surreptitious communications of covert data 36 is then affected by modulating the reference clock 34 with the covert data 36 in modulator 38. This modulated clock signal is then used for sending 40 nominal data from host data source 42 over a communications channel 44. Communications channel 44 can be terrestrial, such as copper and fiber optic, or over-the-air.

On the receive side 46, a Host Data Decoder 48 recovers the host data without any additional processing beyond that required for the transmission type. Signals from communications channel 44 are also coupled to Demodulator 50, which recovers the covert data by reference to an HSO clock 54. Although FIG. 5 shows an HSO clock 34, 54 at both ends of the communications system, it is possible to design a system such that only one HSO is required on the receive side 46.

Figure 5:
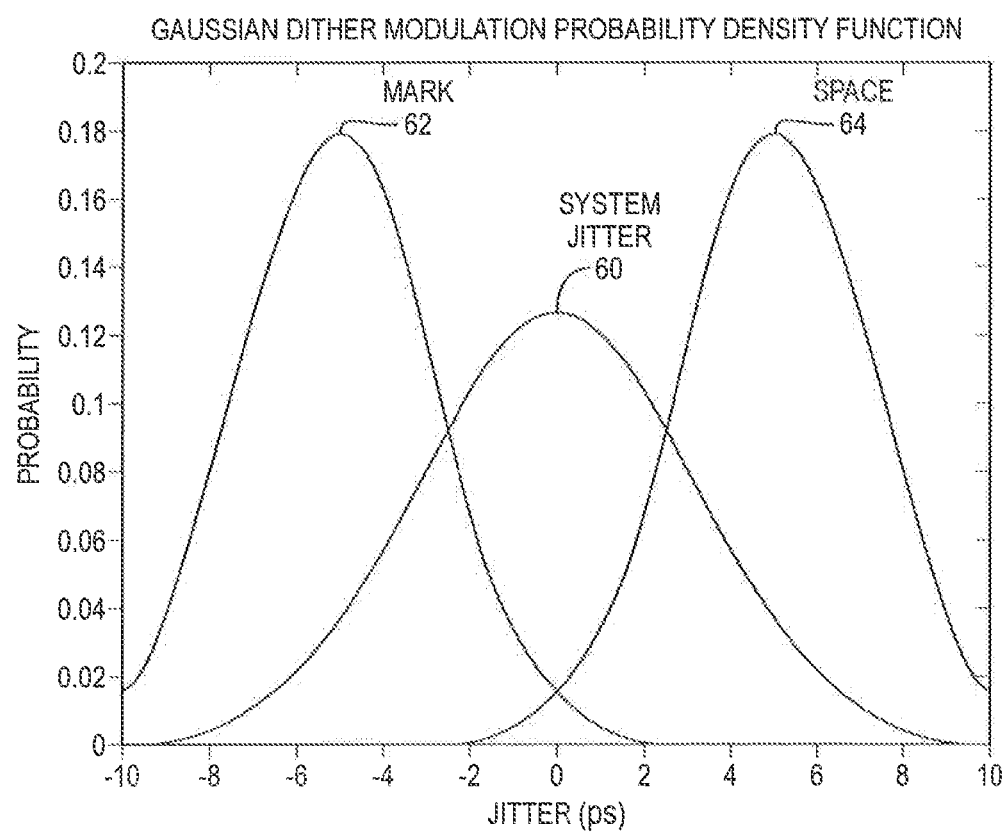
FIG. 5 is a representational graph of timing variations used in a covert communications channel in accordance with one embodiment of the present invention.

FIG. 5 shows a representational graph of the timing variations used in the covert communications channel. The trace 60 in the figure is the probability distribution of a typical oscillator used in a communications system. A "Mark" or a "Space" is transmitted by using a Gaussian random variable to modulate the phase/frequency of the HSO. The location of the "Mark" and "Space" is determined as follows: The full extent of the dither window is divided into two regions. If one assumes for example that the full extent is 20 ps, then the regions are, −10 to 0 and 0 to 10. A Mark is then described by a Gaussian random variable with a mean 62 of −5 ps and a standard deviation of 1 ps. Similarly, a "Space" is described by a random variable with a mean 64 of +5 ps and a standard deviation of 1 ps as shown in FIG. 5.

Statistically, there are times that the system's jitter will obscure the signaling in the covert communications channel. To mitigate this problem, the covert signal is spread using a Direct Sequence Spread Spectrum (DSSS) technique. The DSSS signal is a Maximal Length Sequence (TBR) of length 1025 chips (TBR) which provides a process gain of 30 dB (TBR).

In the manner describe above, a method for carrying data on a live host signal, comprises the steps of: varying timing in a host signal in response to data to be encoded, wherein variations in timing are smaller than a sampling period for detection and capture of the digital signal; receiving the live host signal; sensing timing variations in the received live host signal by comparison to a reference signal; and determining information in the sensed timing variations. The variations in timing may be less than 1 picosecond. The host signal may be a digital signal and the timing variations may be pulse timing variations. The variations in pulse timing may include variation of a leading edge, a trailing edge and pulse width of digital pulses and are smaller than the sampling period for detecting and capturing the digital signal. The reference signal may be a frequency reference having a stability that is better than the level of timing variations of the host signal. Although the method is discussed in terms of a digital signal, the principals are also applicable to analog signals.

Following is a discussion of a system and method for measuring variations or deviation from ideal waveform transitions in a received signal to thereby access covert data encoded according to the above described method.

Figure 6A:
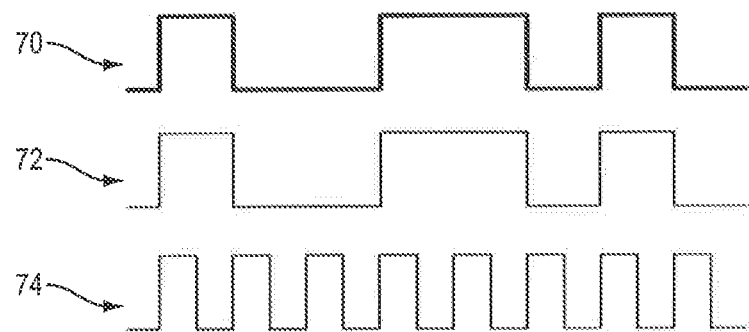
FIGS. 6A and 6B are diagrams of waveforms associated with an embodiment of the present invention.
Figure 6B:
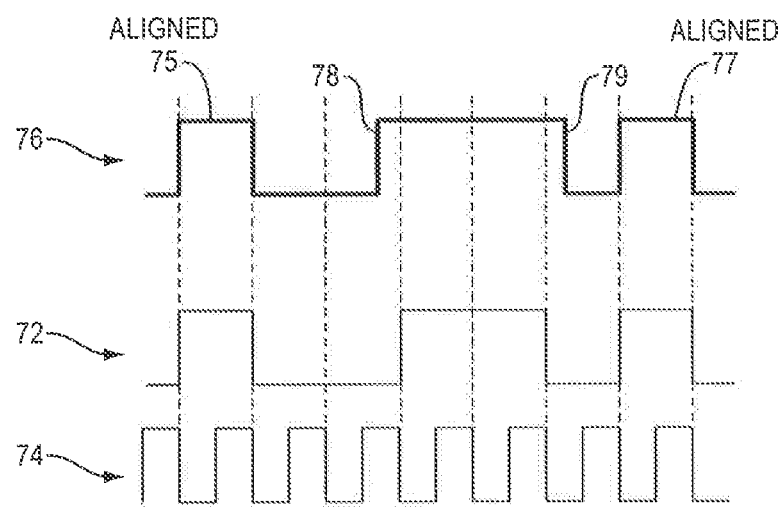

FIG. 6A shows a plot of three digital waveforms 70, 72, 74. Waveform 70 is an example of a digital waveform which has been modulated by the method of the above described invention. Gray or blurred areas 71 represent timing variation or jitter which may occur in individual pulse transitions due to the modulation thereof with covert data. The term pulse transitions refer to leading and trailing edges of the pulses. Waveform 72 shows the same host waveform as waveform 70, except without the timing jitter 71. Waveform 74 shows an example of a reference signal useful for decoding the covert data in waveform 70. FIG. 6B is a variation of FIG. 6A showing a modulated host waveform 76 along with reconstructed waveform 72, and reference waveform 74. Host waveform 76 shows two pulses 75, 77 having leading and trailing edges which are aligned with the pulses of reference waveform 74. Waveform 76 further shows a center pulse having a leading edge 78 which is advanced and a trailing edge 79 which is delayed which misalignment represents data as depicted in the graph of FIG. 5.

Figure 7:
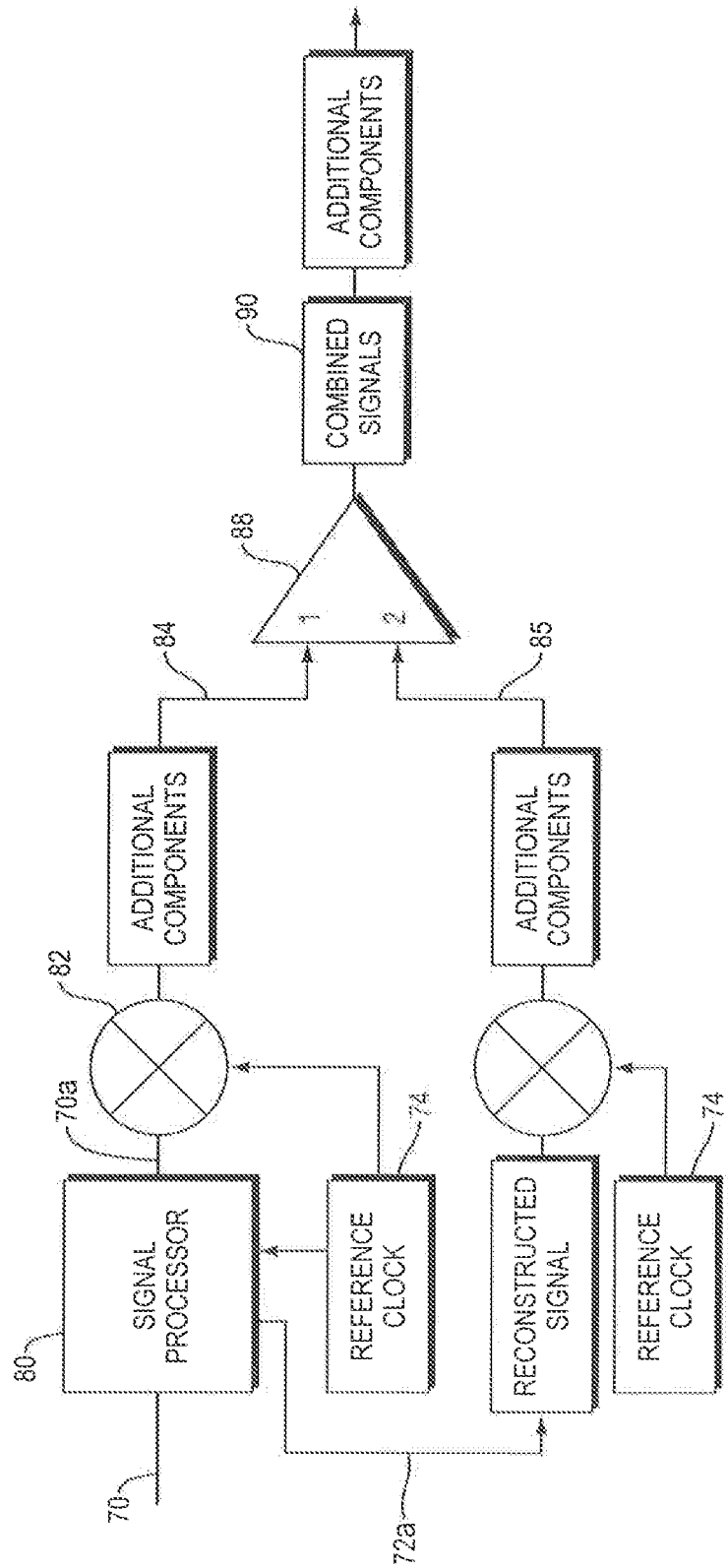
FIG. 7 is a block diagram of a circuit constructed in accordance with one embodiment of the present invention.

FIG. 7 is a block diagram of a circuit constructed according to the present invention. A processing circuit 80 receives the incoming encoded waveform 70 of FIG. 6 along with the reference clock signal 74. Processing circuit 80 reconstructs a copy 72a of the incoming waveform 70 which copy does not include the timing variations or jitter of received waveform 70. This reconstructed waveform 72a is substantially identical to waveform 72 of FIG. 6 in that it replicates the nominal digital data present in host waveform 70. Waveform 72a is reconstructed using the reference signal 74 and thus has the stability of the original host signal prior to the addition of the non-persistent channel. Both the original host signal 70 and the reconstructed host signal 72a are simultaneously coupled to phase detectors 82, 83 along with identical copies of reference signal 74. Processing circuit 80 necessarily includes a slight delay for host signal 70 due to the reconstruction process. This delay enables phase matching between host signal 70 and reconstructed signal 72 a in their respective phase detectors 82, 83. The outputs 84, 85 of phase detectors 82, 83 are coupled to a comparator 88 which subtracts one signal from the other, resulting in a combined signal 90.

Figure 8:
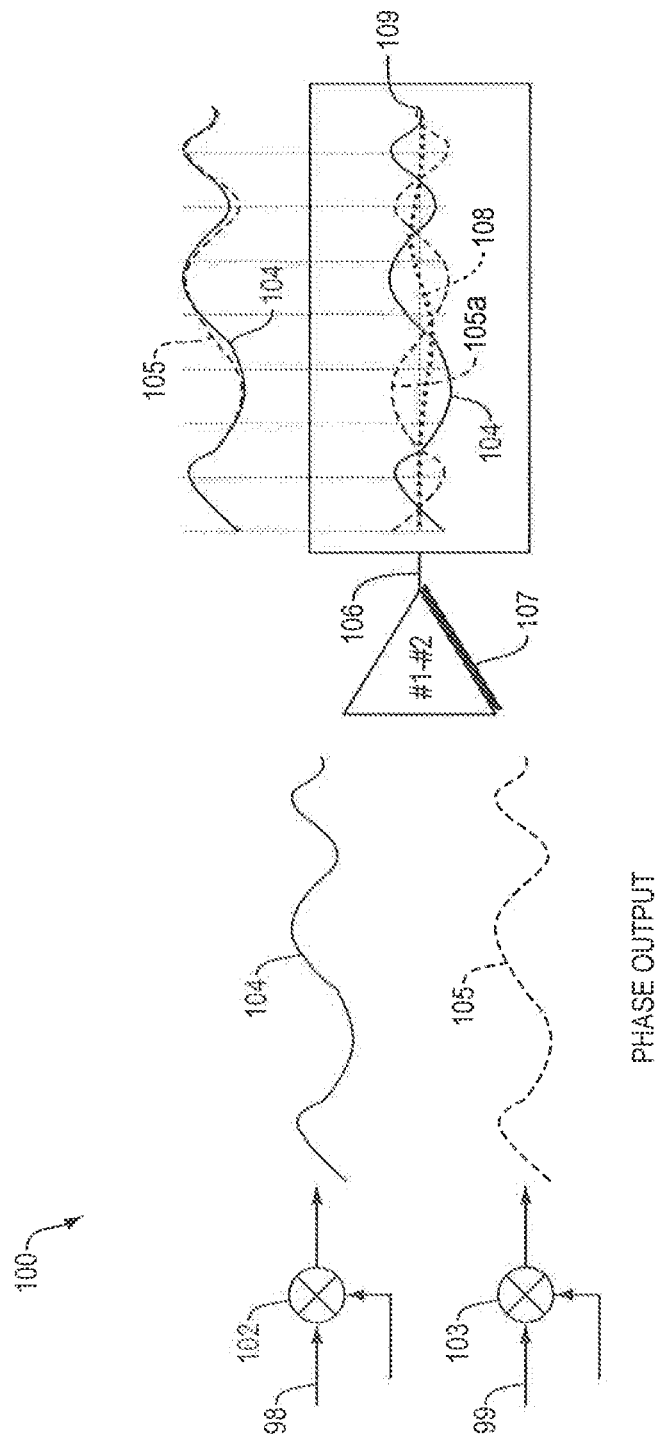
FIG. 8 is a graphic depiction of the application of one embodiment of the present invention.

FIG. 8 is a graphic depiction 100 of the application of the present invention to analog waveforms. A pair of phase detectors 102, 103 provide waveforms 104, 105 as a result of phase detecting an analog host signal 98 against a reconstructed copy 99. Waveforms 104, 105 are shown as overlaid in the upper right portion of the figure, and further shown as subtracted as they would represent the output 106 of comparator 107 waveform. Waveform 105 is subtracted by comparator 107 and is therefore inverted as waveform 105a in the output signal 106. The resulting difference between waveforms 104 and 105 is shown as waveform 108. Portions of waveform 108 extending above zero line 109 could represent a logical "1" and portions of waveform 108 extending below zero line 109 could represent a logical "0".

The present application, SYSTEM AND METHOD TO DETECT TIME-DELAYS IN NON-PERIODIC SIGNALS is being filed on the same day as and in conjunction with related applications: METHODS FOR ENCRYPTION OBFUSCATION, METHOD AND SYSTEM FOR NON-PERSISTENT COMMUNICATION; and METHOD AND SYSTEM FOR NON-PERSISTENT REAL-TIME ENCRYPTION KEY DISTRIBUTION, which applications all share some common inventors herewith, and the contents of which are all hereby incorporated herein in their entirety.

The present invention is illustratively described above in reference to the disclosed embodiments. Various modifications and changes may be made to the disclosed embodiments by persons skilled in the art without departing from the scope of the present invention as defined in the appended claims.

What is claimed is:

1. A method for measuring timing variations and/or deviation from ideal waveform transitions in a first host signal, comprising:

reconstructing a second host signal using the first host signal with reference to a stable clock signal;

simultaneously phase detecting both the first host signal and the second host signal against a common stable clock signal; and comparing the phase detected signals for producing a signal indicating the relative timing variation within the first host signal.

2. The method of claim 1, further comprising the step of deriving data from the indicated relative timing variation within the first host signal.

3. The method of claim 1, wherein the stable clock signal and the common clock signal are the same signal.

4. The method of claim 1, wherein the second host signal reconstructed with reference to the stable clock signal has negligible relative timing variation.

5. The method of claim 1, wherein the stable clock signal has timing stability that is better than the timing variations of the first host signal.

6. The method of claim 1, wherein the first host signal and the clock signal include an identical known timing variation.

7. The method of claim 1, wherein the step of comparing adds or subtracts the phase detected first and second host signals.

8. The method of claim 1, wherein the first host signal is a digital signal.

9. The method of claim 1, wherein the first host signal is an analog signal.

10. A system for measuring timing variations and/or deviation from ideal waveform transitions in a first host signal, comprising:

a processor adapted to reconstructing a second host signal using the first host signal with reference to a stable clock signal;

a pair of phase detectors coupled to simultaneously phase detect both the first host signal and the second host signal against a common stable clock signal; and a comparator coupled for comparing the phase detected signals from the pair of phase detectors for producing a signal indicating the relative timing variation within the first host signal.

11. The system of claim 10, wherein the processor constructs the second host signal to have negligible relative timing variation.

12. The system of claim 10, further comprising a stable oscillator or clock for providing the stable clock signal and the common clock signal.

13. The system of claim 12, wherein the stable clock signal has timing stability that is better than the timing variations of the first host signal.

14. The system of claim 10, wherein the comparator adds or subtracts the phase detected first and second host signals.

* * * * *

UNITED STATES PATENT AND TRADEMARK OFFICE
CERTIFICATE OF CORRECTION

| | | |
|---|---|---|
| PATENT NO. | : 9,698,835 B2 | Page 1 of 1 |
| APPLICATION NO. | : 14/704929 | |
| DATED | : July 4, 2017 | |
| INVENTOR(S) | : Andrew M. Kowalevicz | |

It is certified that error appears in the above-identified patent and that said Letters Patent is hereby corrected as shown below:

In the Specification

In Column 5, Line 38, delete "OBFUSCATION," and insert --OBFUSCATION;-- therefor Signed and Sealed this
Nineteenth Day of January, 2021

Andrei Iancu
*Director of the United States Patent and Trademark Office*